(12) United States Patent
Lee

(10) Patent No.: US 11,169,860 B2
(45) Date of Patent: Nov. 9, 2021

(54) ELECTRONIC DEVICE AND METHOD FOR PROVIDING NOTIFICATION INFORMATION THEREBY

(71) Applicant: Samsung Electronics Co., Ltd., Suwon-si (KR)

(72) Inventor: Hwajun Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/899,070

(22) Filed: Jun. 11, 2020

(65) Prior Publication Data

US 2020/0394086 A1    Dec. 17, 2020

(30) Foreign Application Priority Data

Jun. 12, 2019 (KR) .................. 10-2019-0069410

(51) Int. Cl.
```
G06F 9/54      (2006.01)
G06F 21/84     (2013.01)
G06F 3/01      (2006.01)
G06F 3/16      (2006.01)
```
(52) U.S. Cl.
CPC .............. *G06F 9/542* (2013.01); *G06F 3/011* (2013.01); *G06F 3/017* (2013.01); *G06F 3/16* (2013.01); *G06F 21/84* (2013.01); *G06F 2221/2149* (2013.01)

(58) Field of Classification Search
None
See application file for complete search history.

(56) References Cited

U.S. PATENT DOCUMENTS

| 8,462,949 B2* | 6/2013 | Anderson | G06F 21/60 |
| | | | 380/252 |
| 8,955,147 B2* | 2/2015 | Lee | G06F 21/6245 |
| | | | 726/27 |
| 9,367,739 B2* | 6/2016 | Joo | H04W 12/06 |
| 9,959,431 B2* | 5/2018 | Flowers | G06F 21/84 |

(Continued)

FOREIGN PATENT DOCUMENTS

| JP | 2009-267504 A | 11/2009 |
| JP | 6251906 B2 | 12/2017 |
| KR | 10-2018-0045669 A | 5/2018 |

OTHER PUBLICATIONS

International Search Report dated Oct. 8, 2020, issued in International Application No. PCT/KR2020/007676.

*Primary Examiner* — Umut Onat
(74) *Attorney, Agent, or Firm* — Jefferson IP Law, LLP

(57) ABSTRACT

A method for providing notification information by an electronic device is provided. The method includes the operations of operating in a normal mode in which notification information is provided, identifying existence of a different person near the electronic device while operating in the normal mode, determining whether the different person is an information sharer allowed by a user of the electronic device to share notification information, operating in the normal mode in which notification information is provided without being limited, in response to determining that the different person is an information sharer, and operating in a privacy mode in which notification information is limited and provided, in response to determining that the different person is not an information sharer.

20 Claims, 12 Drawing Sheets

(56) References Cited

U.S. PATENT DOCUMENTS

| | | | |
|---|---|---|---|
| 10,025,938 B2* | 7/2018 | Krishnamurthi | G06F 1/1684 |
| 10,199,042 B2 | 2/2019 | Rodriguez et al. | |
| 10,282,563 B2* | 5/2019 | Anderson | G06F 3/013 |
| 10,366,219 B2* | 7/2019 | Kurian | G06F 3/167 |
| 10,685,127 B2* | 6/2020 | Kundu | G06F 21/84 |
| 10,740,486 B2* | 8/2020 | DeLuca | G09G 3/20 |
| 10,839,064 B2* | 11/2020 | Mistry | G06F 21/36 |
| 2010/0124363 A1* | 5/2010 | Ek | G06F 21/6245 |
| | | | 382/118 |
| 2010/0205667 A1* | 8/2010 | Anderson | G06F 3/017 |
| | | | 726/19 |
| 2012/0157044 A1* | 6/2012 | Kim | H04W 12/086 |
| | | | 455/410 |
| 2014/0157424 A1 | 6/2014 | Lee et al. | |
| 2015/0003691 A1 | 1/2015 | Joo et al. | |
| 2015/0116212 A1 | 4/2015 | Freed et al. | |
| 2016/0350553 A1 | 12/2016 | Alameh et al. | |
| 2018/0225478 A1 | 8/2018 | Deluca et al. | |

* cited by examiner

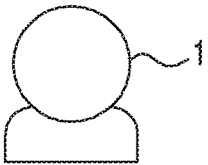
Another person ⊂ Information sharer

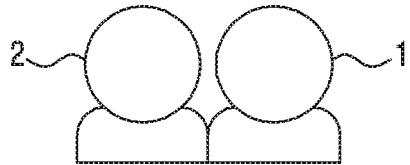
Another person ⊄ Information sharer
FIG.2C1 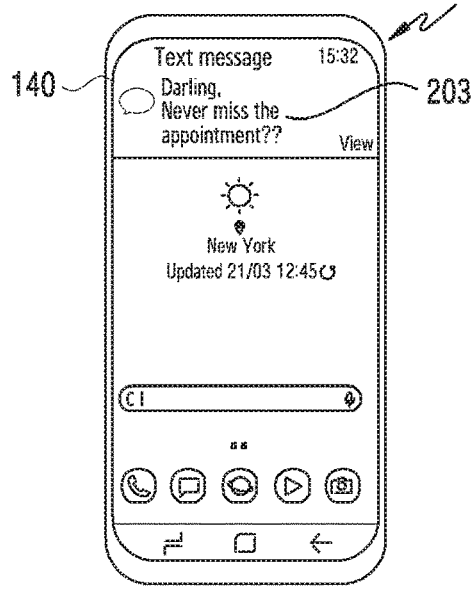
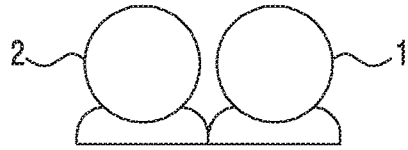
FIG.2C2 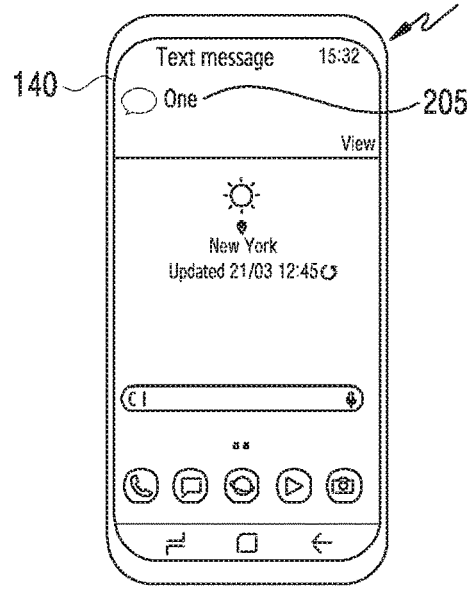
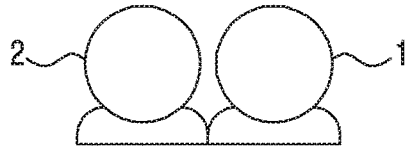

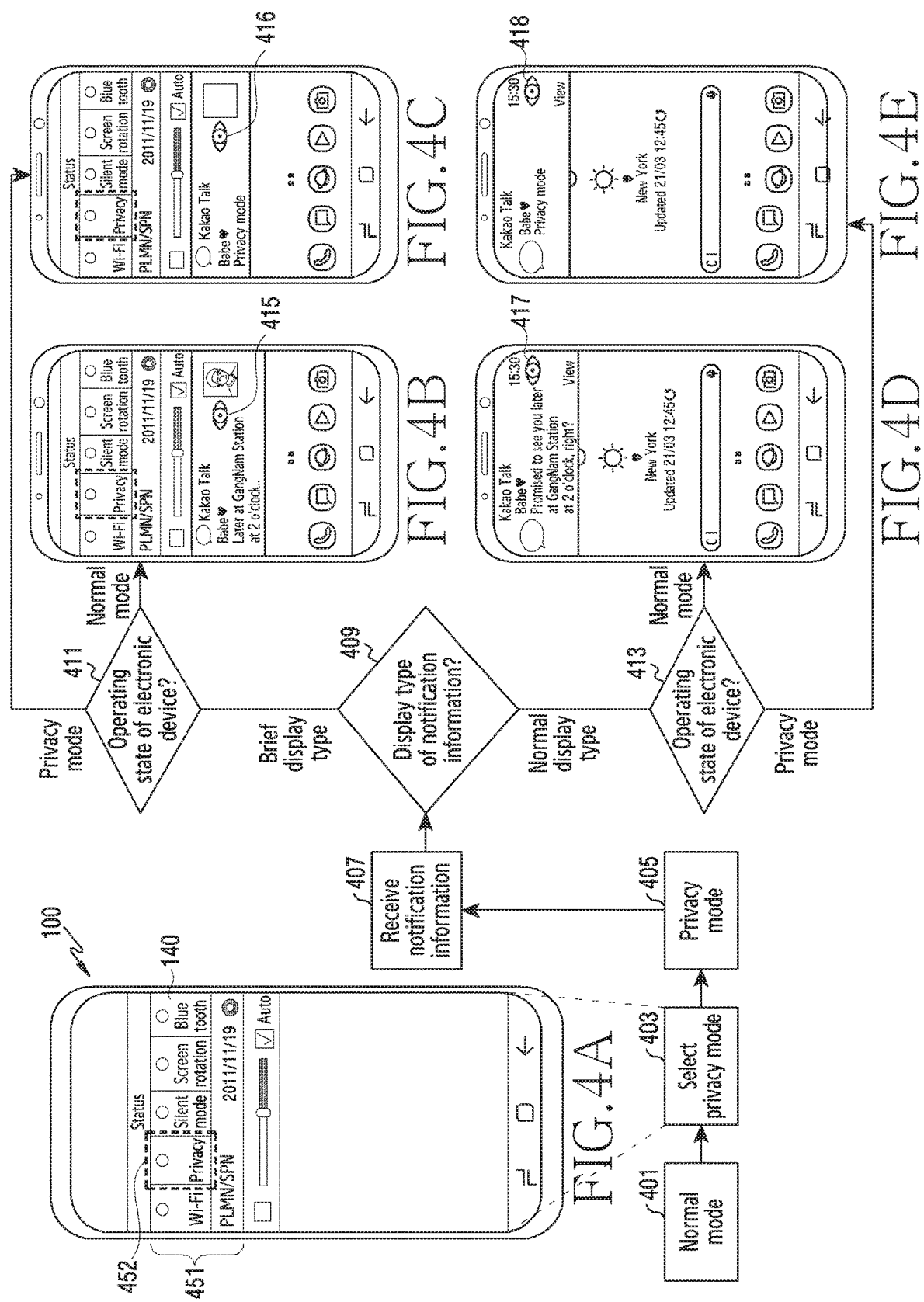

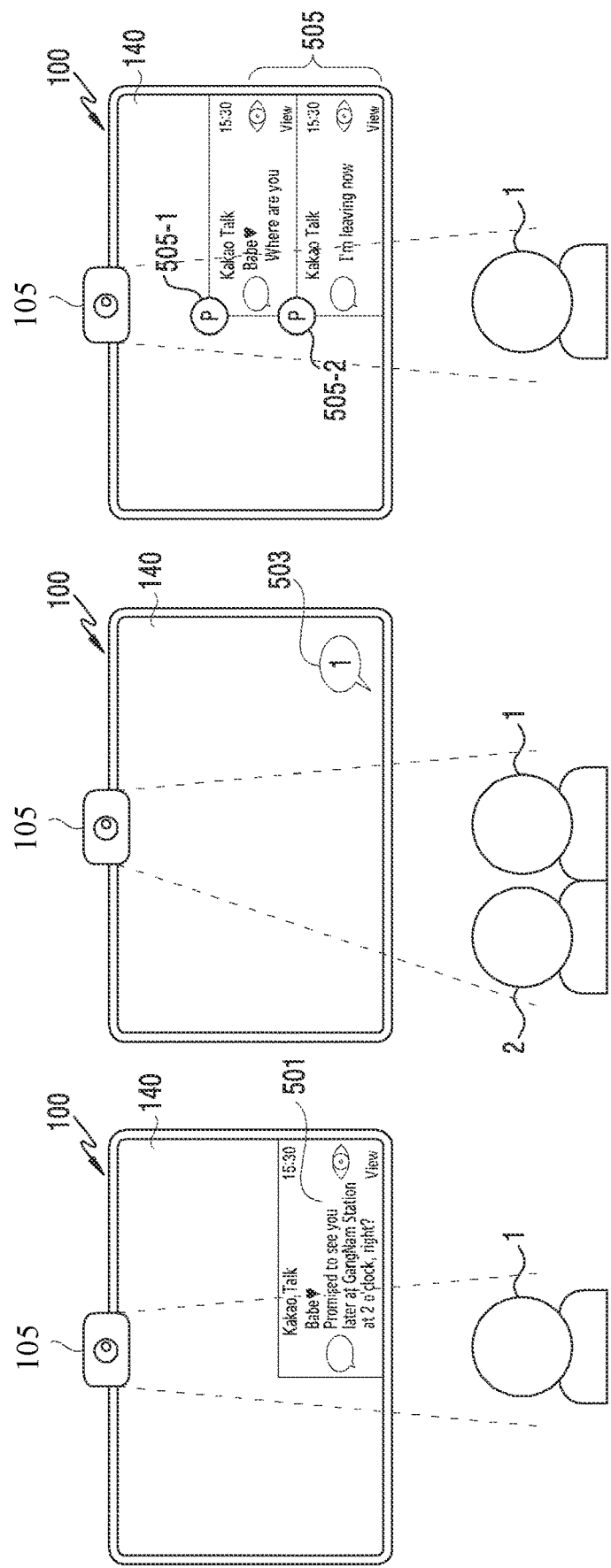

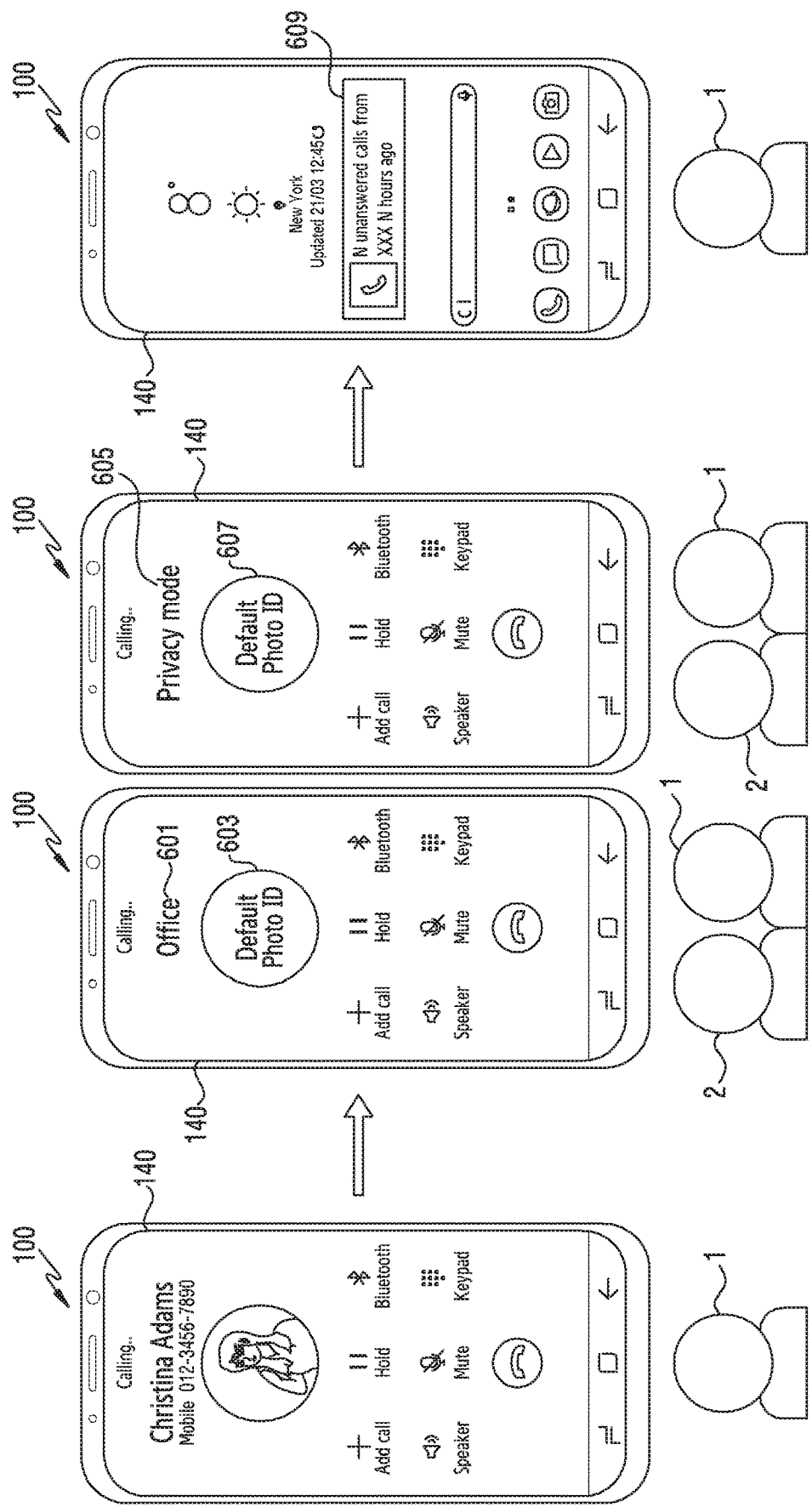

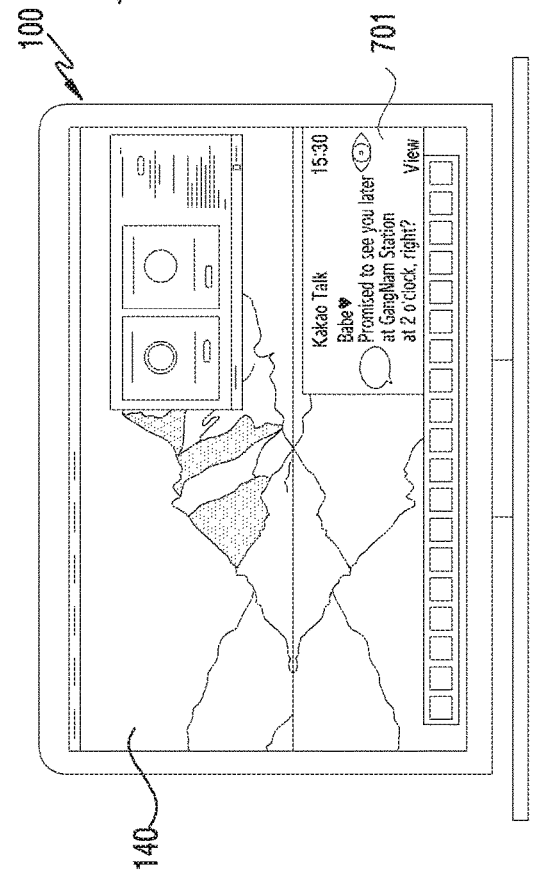
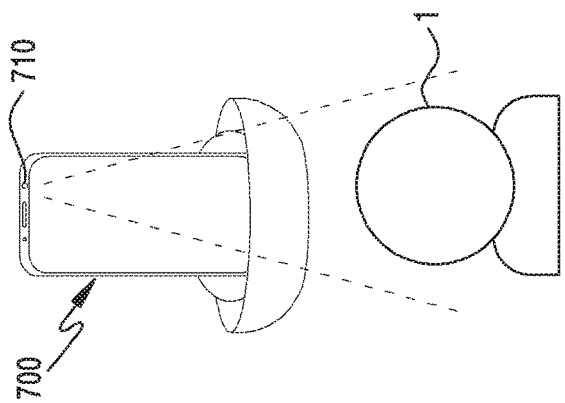
FIG.7A
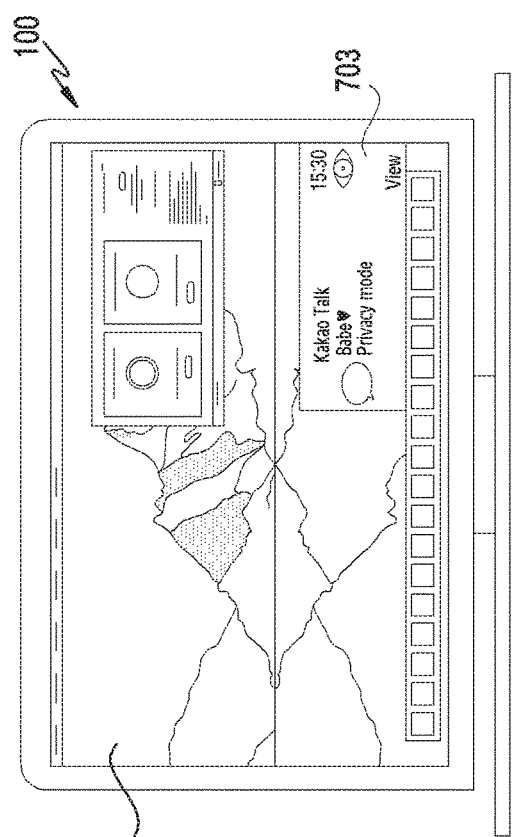
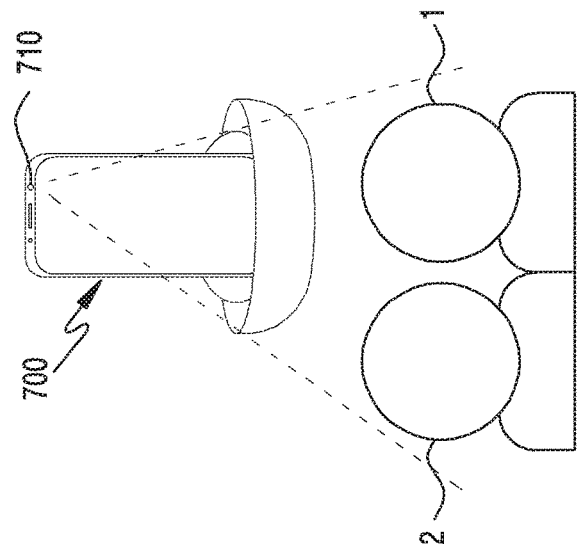
FIG.7B

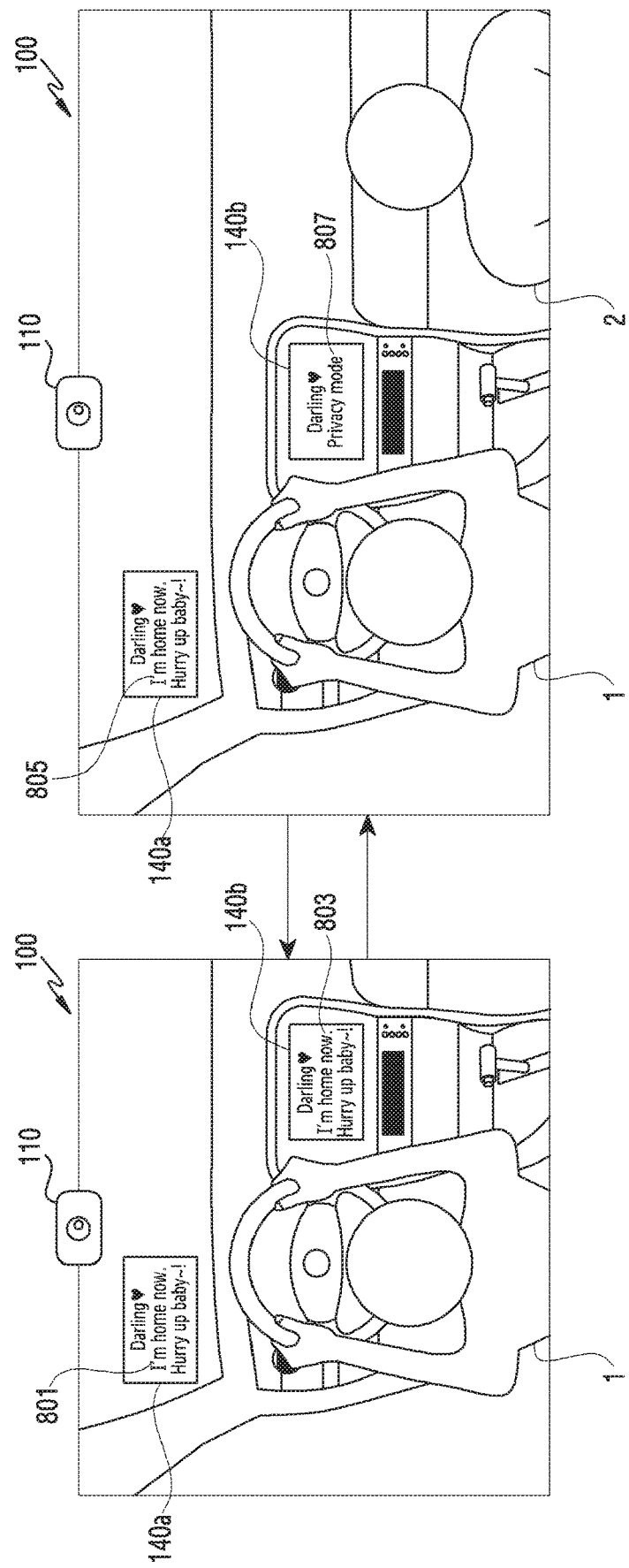

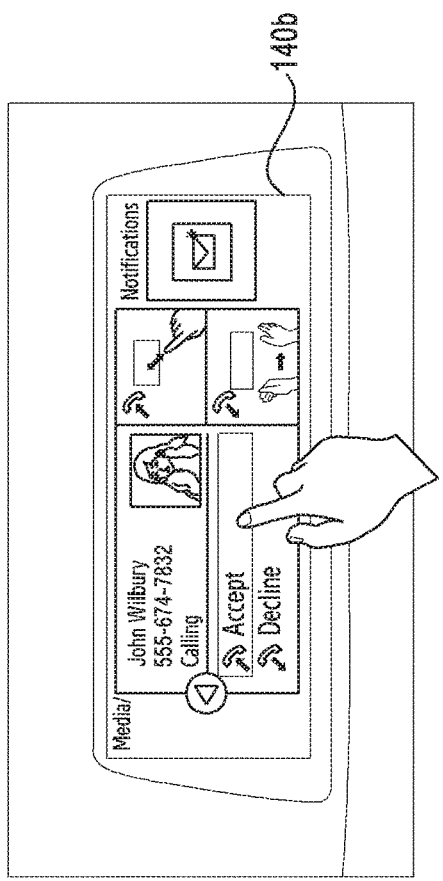
FIG.9A1
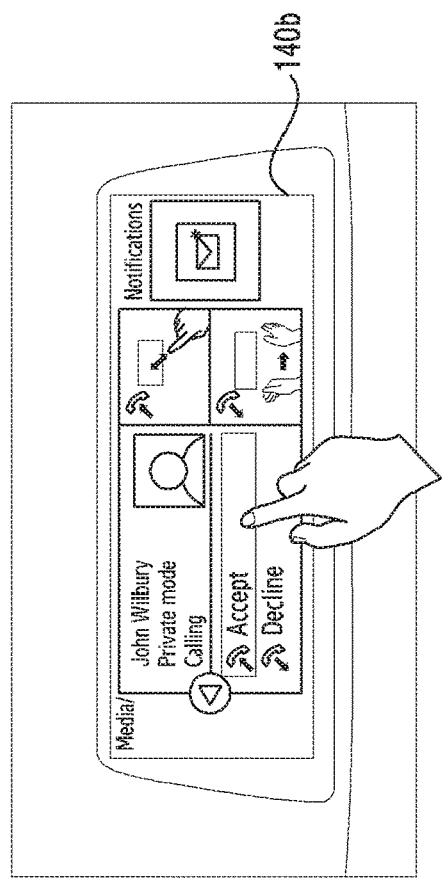
FIG.9B1
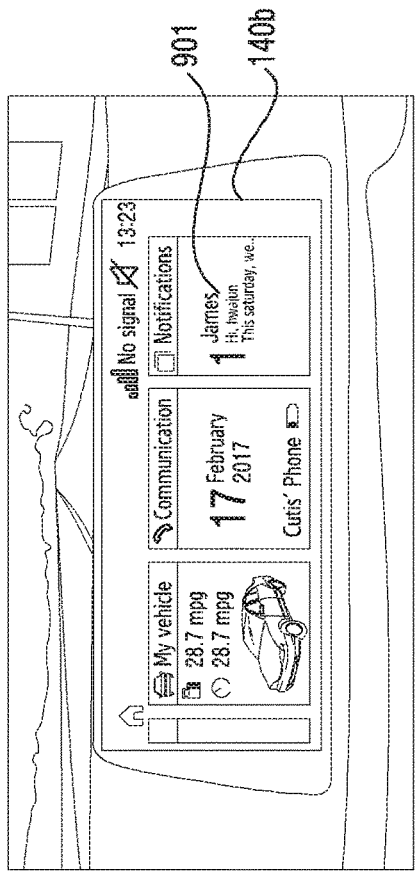
FIG.9A2
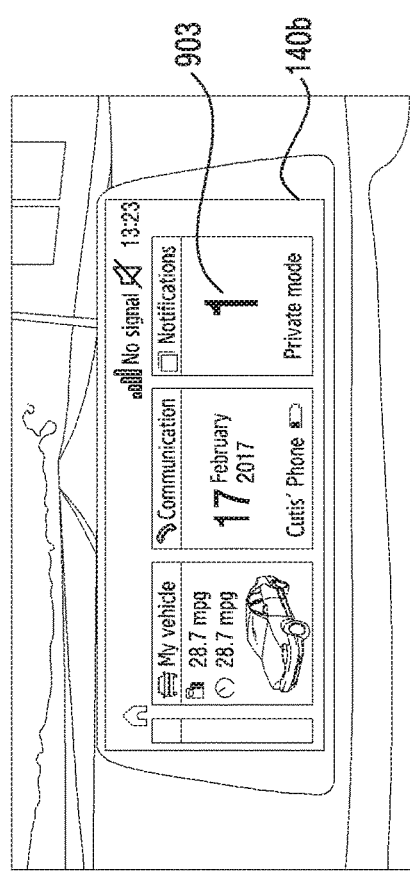
FIG.9B2

ELECTRONIC DEVICE AND METHOD FOR PROVIDING NOTIFICATION INFORMATION THEREBY

CROSS-REFERENCE TO RELATED APPLICATION(S)

This application is based on and claims priority under 35 U.S.C. § 119(a) of a Korean patent application number 10-2019-0069410, filed on Jun. 12, 2019, in the Korean Intellectual Property Office, the disclosure of which is incorporated by reference herein in its entirety.

BACKGROUND

1. Field

The disclosure relates to an electronic device and a method for providing notification information by the electronic device.

2. Description of Related Art

Electronic devices may provide various functions for users. For example, electronic devices may provide notification information for users. Notification information may include text message information, telephone call reception information, instant message information, or the like.

Such notification information may be related to individual users in most cases. If other people exist near an electronic device, it is highly likely that notification information for the user himself/herself may be seen by the other people in an unwanted manner.

Most users are repulsed by sharing their notification information with other people. For example, if an electronic device is positioned at such a place that it can be seen by the public, or if the user is positioned close to others, the user may be repulsed by the fact that his/her notification information is visible to others, and this may interfere with using the electronic device as desired.

The above information is presented as background information only to assist with an understanding of the disclosure. No determination has been made, and no assertion is made, as to whether any of the above might be applicable as prior art with regard to the disclosure.

SUMMARY

The user of an electronic device takes a passive action, such as moving away from others, or covering notification information, in order to hide his/her notification information from others. However, such an approach is not only inconvenient, but also poses a problem in that others may already have seen the notification information.

Aspects of the disclosure are to address at least the above-mentioned problems and/or disadvantages and to provide at least the advantages described below. Accordingly, an aspect of the disclosure is to provide a method for providing the user's own notification information in view of the peripheral situation, and an electronic device for performing such a method.

Additional aspects will be set forth in part in the description which follows and, in part, will be apparent from the description, or may be learned by practice of the presented embodiments.

In accordance with an aspect of the disclosure, an application control method is provided. The application control method includes the operations of operating in a normal mode in which notification information is provided, identifying existence of a different person near the electronic device while operating in the normal mode, determining whether or not the different person is an information sharer allowed by a user of the electronic device to share notification information, operating in the normal mode in which notification information is provided without being limited, in response to determining that the different person is an information sharer, and operating in a privacy mode in which notification information is limited and provided, in response to determining that the different person is not an information sharer.

In accordance with another aspect of the disclosure, an electronic device is provided. The electronic device includes a sensing circuit, a memory configured to store at least one instruction, and a processor operably connected to the sensing circuit and the memory, wherein the memory is further configured to store at least one instruction configured to cause the processor, when executed, to identify existence of a different person near the electronic device, based on a sensing value sensed via the sensing circuit while operating in a normal mode in which notification information is provided, determine whether or not the different person is an information sharer allowed by a user of the electronic device to share notification information, operate the electronic device in the normal mode in which notification information is provided without being limited, in response to determining that the different person is an information sharer, and operate the electronic device in a privacy mode in which notification information is limited and provided, in response to determining that the different person is not an information sharer.

According to the disclosure, it is possible to selectively switch between a normal mode and a privacy mode according to whether or not other people exist, thereby protecting the privacy of the user of the electronic device. In particular, it is possible to automatically switch between the normal mode and the privacy mode according to whether or not other people are information sharers who are allowed to share notification information, thereby further facilitating use/manipulation of the electronic device.

The disclosure proposes various schemes capable of identifying the existence of other people near the electronic device such that, even in a situation in which some schemes cannot work, existence of others can be identified according to other schemes. In addition, the disclosure proposes a scheme for identifying existence of other people near the electronic device by using a sensing value acquired by a third device, thereby overcoming resources of the electronic device.

In addition, in the disclosure, it is possible to determine information sharers who are allowed to share notification information according to a condition desired by the user. For example, the electronic device determines whether or not another person is an information sharer, based on the user's action (for example, selecting the privacy mode on a quick panel, or selecting image information related to another person), or determines whether or not another person is an information sharer, based on association between recognition information recognized in connection with another person and pre-registered information sharer information.

According to the above-described disclosure, the user of the electronic device may determine notification information without any concern of privacy infringement by others, and this may improve the degree of satisfaction of the user of the electronic device and the degree of utilization thereof.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2C1 is a diagram illustrating a process of providing notification information according to an embodiment of the disclosure;

FIG. 2C2 is a diagram illustrating a process of providing notification information according to an embodiment of the disclosure;

FIG. 4A is a diagram illustrating a privacy-mode operation according to an embodiment of the disclosure;

FIG. 4B is a diagram illustrating a privacy-mode operation according to an embodiment of the disclosure;

FIG. 4C is a diagram illustrating a privacy-mode operation according to an embodiment of the disclosure;

FIG. 4D is a diagram illustrating a privacy-mode operation according to an embodiment of the disclosure;

FIG. 4E is a diagram illustrating a privacy-mode operation according to an embodiment of the disclosure;

FIG. 5A is a diagram illustrating a privacy-mode operation in a message receiving situation according to an embodiment of the disclosure;

FIG. 5B is a diagram illustrating a privacy-mode operation in a message receiving situation according to an embodiment of the disclosure;

FIG. 5C is a diagram illustrating a privacy-mode operation in a message receiving situation according to an embodiment of the disclosure;

FIG. 6A is a diagram illustrating a privacy-mode operation in a telephone call receiving situation according to an embodiment of the disclosure;

FIG. 6B1 is a diagram illustrating a privacy-mode operation in a telephone call receiving situation according to an embodiment of the disclosure;

FIG. 6B2 is a diagram illustrating a privacy-mode operation in a telephone call receiving situation according to an embodiment of the disclosure;

FIG. 6C is a diagram illustrating a privacy-mode operation in a telephone call receiving situation according to an embodiment of the disclosure;

FIG. 7A is a diagram illustrating a privacy-mode operation using a sensing value from a third device according to an embodiment of the disclosure;

FIG. 7B is a diagram illustrating a privacy-mode operation using a sensing value from a third device according to an embodiment of the disclosure;

FIG. 8A is a diagram illustrating a privacy-mode operation in a transportation device according to an embodiment of the disclosure;

FIG. 8B is a diagram illustrating a privacy-mode operation in a transportation device according to an embodiment of the disclosure;

FIG. 9A1 is a diagram illustrating a privacy-mode operation in a transportation device according to an embodiment of the disclosure;

FIG. 9A2 is a diagram illustrating a privacy-mode operation in a transportation device according to an embodiment of the disclosure;

FIG. 9B1 is a diagram illustrating a privacy-mode operation in a transportation device according to an embodiment of the disclosure;

FIG. 9B2 is a diagram illustrating a privacy-mode operation in a transportation device according to an embodiment of the disclosure;

Throughout the drawings, it should be noted that like reference numbers are used to depict the same or similar elements, features, and structures.

DETAILED DESCRIPTION

Figure 1:
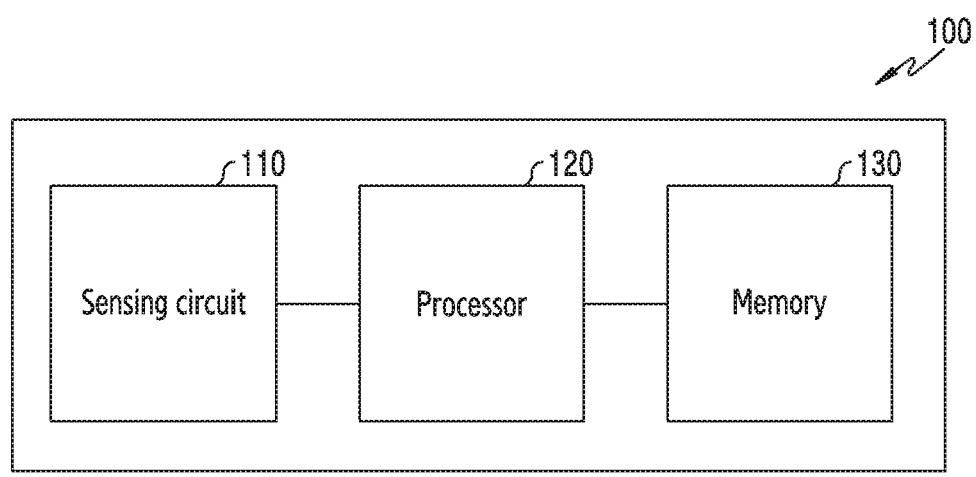
FIG. 1 is a block diagram of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via another element (e.g., third element).

FIG. 1 is a block diagram of an electronic device according to an embodiment of the disclosure.

Referring to FIG. 1, an electronic device 100 may include a sensing circuit 110, a processor 120, and a memory 130.

The electronic device 100 may be one of various types of devices. For example, the electronic device may be a portable communication device (for example, smartphone), a computer device, a portable multimedia device, portable medical equipment, a camera, a wearable device, a home appliance, or a transportation device, but is not limited thereto.

The sensing circuit 110 is configured to sense the periphery of the electronic device 100, thereby acquiring a sensing value for identifying existence of another person near the electronic device 100. The sensing circuit 110 includes, for example, at least one of a camera module (for example, 1280 in FIG. 12), a microphone (for example, microphone as an example of input device 1250 in FIG. 12), or an audio module (for example, 1270 in FIG. 12). Alternatively, the sensing circuit 110 may include a communication module (for example, 1290 in FIG. 12) for identifying existence of another person.

The memory 130 may store various kinds of software programs (or applications) necessary for operation of the electronic device 100 and various kinds of data and instructions for operation of the electronic device 100. At least a part of such a program may be downloaded from an external server via wired or wireless communication. The memory 130 may be accessed by the processor 120, and the processor 120 may perform reading/recording/modifying/deleting/updating or the like of the software programs, data, and instructions included in the memory 130. In addition, the memory 130 may store a program for controlling overall operations of the electronic device, an operating system (OS) for booting the electronic device, application programs necessary for other option function of the electronic device, such as a camera function, a moving image playback function, and a short-range wireless communication function, received text messages, sent text messages, and the like.

Specifically, the memory 130 may store at least one instruction configured to cause at least one processor 120, when executed, to identify existence of another person near the electronic device 100, based on a sensing value sensed via the sensing circuit 110, while operating in a normal mode in which at least one piece of notification information is provided, determine whether or not the other person is an information sharer allowed by the user of the electronic device 100 to share notification information; operate the electronic device 100 in the normal mode in which notification information is provided without being limited, in response to determining that the other person is an information sharer, and operate the electronic device 100 in a privacy mode in which notification information is limited and provided, in response to determining that the other person is not an information sharer.

In addition, the memory 130 may store at least one instruction configured to cause at least one processor 120, when executed, to identify existence of another person near the electronic device 100, based on the intensity of a short-range wireless communication signal near the electronic device 100 sensed via the sensing circuit 110.

In addition, the memory 130 may store at least one instruction configured to cause at least one processor 120, when executed, to identify existence of another person near the electronic device 100, based on the intensity of a voice signal obtained by excluding the user's voice signal from a voice signal near the electronic device 100 sensed via the sensing signal 110.

In addition, the memory 130 may store at least one instruction configured to cause at least one processor 120, when executed, to identify existence of another person near the electronic device 100, based on a sensing value sensed by a third device positioned outside the electronic device 100.

In addition, the memory 130 may store at least one instruction configured to cause at least one processor 120, when executed, to determine that another person is not an information sharer, in response to selection of the privacy mode via a quick panel of the electronic device 100, when existence of the other person is identified near the electronic device 100.

In addition, the memory 130 may store at least one instruction configured to cause at least one processor 120, when executed, to determine that the identified other person is an information sharer, based on association between recognition information recognized in connection with the other person and preregistered information sharer information.

In addition, the memory 130 may store at least one instruction configured to cause at least one processor 120, when executed, to determine the level of limitation of notification information provided in the privacy mode, and operate the electronic device 100 in the privacy mode in which notification information is limited according to the level of limitation and provided.

In addition, the memory 130 may store at least one instruction configured to operate the electronic device 100 in the normal mode again from the privacy mode, and provide previous notification information acquired while the electronic device 100 operates in the privacy mode, in response to operation of the electronic device 100 in the normal mode.

In addition, the memory 130 may store at least one instruction configured to acquire notification information while the electronic device 100 operates in the privacy mode, and provide limited notification information produced by processing at least a part of the notification information, substituting different information therefor, or omitting at least a part of the notification information.

The electronic device 100 may further include a display (not illustrated). The display may perform an input function and a display function. The display is configured to display various kinds of menus, information entered by the user, or notification information to be provided to the user. For example, the display may provide various screens, such as a home screen, a message composition screen, a received and/or transmitted text message display screen, a web page screen, a telephone speech screen, or the like. The display may be made of a liquid crystal display, an organic light-emitting diode (OLED), an active matrix organic light-emitting diode (AMOLED), or the like.

When the electronic device 100 further includes a display, the memory 130 may store at least one instruction configured to cause the same to control the display so as to display image information related to another person, and determine that the identified other person is an information sharer, based on selection of the image information.

The processor 120 may control overall operations of the electronic device 100. For example, the processor 120 may copy various kinds of software programs or instructions stored in the memory 130 to a RAM and then execute the same, thereby performing various operations.

Specifically, the processor 120 may identify existence of another person near the electronic device 100 based on a sensing value sensed via the sensing circuit 110 while operating in a normal mode in which at least one pieces of notification information is provided, determine whether or not the other person is an information sharer allowed by the user of the electronic device 100 to share notification information, operate the electronic device 100 in a normal mode in which notification information is provided without being limited, in response to determining that the other person is an information sharer, and operate the electronic device 100 in a privacy mode in which notification information is limited and provided, in response to determining that the other person is not an information sharer.

Figure 2A:
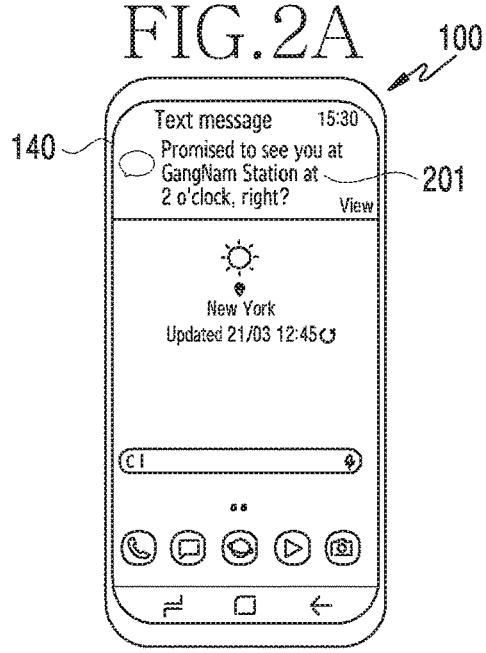
FIG. 2A is a diagram illustrating a process of providing notification information according to an embodiment of the disclosure.
Figure 2B:
FIG. 2B is a diagram illustrating a process of providing notification information according to an embodiment of the disclosure.

FIG. 2A is a diagram illustrating a process of providing notification information according to an embodiment of the disclosure, FIG. 2B is a diagram illustrating a process of providing notification information according to an embodiment of the disclosure, FIG. 2C1 is a diagram illustrating a process of providing notification information according to an embodiment of the disclosure, and FIG. 2C2 is a diagram illustrating a process of providing notification information according to an embodiment of the disclosure.

Referring to FIG. 2A, the electronic device 100 may operate in a normal mode in which notification information is provided. The normal mode refers to a mode in which the electronic device 100 provides notification information with no limitation according to the disclosure, and may be a mode that is started initially when the electronic device 100 is turned on, for example.

In FIG. 2A, if notification information 201 is acquired, the processor 120 may control the display 140 such that the notification information 201 is provided to the user 1. The notification information may include, for example, at least one of telephone call reception information, text message information, email message information, instant message information, social service information, alarm information, timer information, battery information, or schedule information. In addition, the notification information according to the disclosure may include not only notification content included in the notification information, but also the originator (or sender) of the notification information, the time at which the notification information was sent, and a file attached to the notification information.

While the electronic device 100 operates in the normal mode, another person 2 may be positioned near the electronic device 100 as in FIG. 2B. For example, another person 2 may approach the front of the electronic device 100 with intent to share the display 140 with the user 1. In response thereto, the processor 120 may identify the existence of another person positioned near the electronic device 100, based on a sensing value sensed by the sensing circuit 110.

For example, the processor 120 may identify the existence of another person positioned near the electronic device 100, based on the intensity of a short-range wireless communication signal, voice recognition using a microphone, image recognition using a camera, or whether or not a short-range wireless communication signal is connected. Alternatively, the processor 120 may identify the existence of another person, based on information recognized by a third device. For example, if the sensing circuit used to identify whether or not another person exists is absent from the electronic device 100 or is deactivated, the electronic device 100 may identify existence of another person by using a sensing circuit (for example, camera) of a third device. For example, if the electronic device 100 (for example, laptop computer or monitor having no camera) and a third device (for example, smartphone) are connected in a screen sharing mode (for example, DeX mode), the electronic device 100 may identify the existence of another person positioned near the electronic device 100 by using the camera of the third device. Alternatively, the electronic device 100 may identify the existence of another person, based on the position of the electronic device 100. For example, if the electronic device 100 is deemed to be positioned at a public place (for example, company, school, or subway), the processor 120 may identify that another person 2 exists near the electronic device 100.

If existence of another person is identified, the processor 120 may determine whether or not the other person is an information sharer allowed by the user 1 of the electronic device 100 to share notification information. The processor 120 may determine whether or not the other person is an information sharer allowed by the user 1 of the electronic device 100 to share notification information, while operating in the normal mode. Alternatively, if another person is recognized, the processor 120 may switch to the privacy mode and may determine whether or not the other person is an information sharer allowed by the user 1 of the electronic device 100 to share notification information, while operating in the privacy mode.

The processor 120 may determine whether or not the other person is an information sharer, based on the user's selection or preregistered information for determining whether or not the other person is an information sharer.

For example, if existence of another person is identified, the processor 120 may display image information related to the identified other person. For example, the processor 120 may control the display 140 so as to display the other person's face on one side thereof. In this case, the processor 120 may determine that the identified other person is an information sharer, in response to a user input of selecting the other person's face as an information sharer allowed to share notification information.

As another example, if existence of another person is identified, the processor 120 may determine association between recognition information related to the other person and preregistered information sharer information. If it is confirmed as a result of determining that there is a high degree of association between the recognition information related to the other person and the preregistered information sharer information, the processor 120 may determine that the identified other person is an information sharer.

For example, the user may preregister an information sharer, who will be allowed to share notification information. For example, if the user selects an acquaintance from an acquaintance list to register him/her as an information sharer, the processor 120 may register at least one of the selected acquaintance's voice signal or image (for example, profile picture) as information of the information sharer. The processor 120 may determine the association between pre-registered information sharer information and the other person's voice signal or image, as recognition information related to the information sharer. For example, the processor 120 may determine the association by using a face recognition algorithm or a voice recognition algorithm using a neural network model (for example, convolutional neural network (CNN), deep neural network (DNN), recurrent neural network (RNN), or restricted Boltzmann machine)). If it is confirmed as a result of determining that there is a high degree of association between the recognition information related to the other person and the information sharer information, the processor 120 may determine that the identified other person is an information sharer.

Referring to FIG. 2B, if the other person is determined as an information sharer, the processor 120 may operate the electronic device 100 in a normal mode in which notification information is provided, without being limited, via the display 140, as in FIG. 2C1.

Referring to FIG. 2C1, for example, if notification information is acquired, the processor 120 may provide the notification information 203 with no limitation. In this case, the processor 120 may include all or most content of the notification information.

Referring to FIG. 2C2, on the other hand, if it is determined that the other person is not an information sharer, the processor 120 may operate the electronic device 100 in a privacy mode in which limited notification information 205 is provided via the display 140, as in FIG. 2C2. If notification information is acquired while operating in the privacy mode, the processor 120 produce limited notification information 205 by processing at least a part of the notification information, substituting different information therefor, or omitting at least a part of the notification information. In addition, the processor 120 may control the display 140 so as to display the limited notification information 205. The limited notification information may be the number of pieces of notification information, the sender of the notification information, senders of notification information and the number of pieces of notification information for each sender, or a part of notification content. In another embodiment of the disclosure, the processor 120 may not provide notification information itself in the privacy mode. In another embodiment of the disclosure, the processor 120 may provide, as limited notification information, visual information (for example, icon) indicating via which program notification information has been received, on a system bar on the top of the screen.

Meanwhile, before the electronic device 100 operates in the privacy mode, the processor 120 may provide a popup message for confirming whether or not to operate in the privacy mode. In this case, the electronic device 100 may operate in the privacy mode in response to a user input that allows operation in the privacy mode via the popup message.

In an embodiment of the disclosure, the processor 120 may control the display 140 so as to display a privacy mode configuration screen. In this case, the user may select an exceptional application (or program), to which the privacy mode is not to be applied, via the privacy mode configuration screen. Accordingly, the selected exceptional application may continuously operate as in the normal mode, even in a situation in which the electronic device 100 switches to the privacy mode. For example, if notification information is provided via the exceptional application, the processor 120 may provide the notification information with no limitation. Alternatively, the user may select a place at which the privacy mode is not to be applied, via the privacy mode configuration screen. Accordingly, the electronic device 100 may configure an exception to the privacy mode such that the privacy mode does not operate at the specific plate (for example, inside home) selected by the user.

In another example, if the user may configure the level of limitation of notification information provided in the privacy mode via the privacy mode configuration screen, the electronic device 100 may then provide notification information acquired while operating in the privacy mode according to the level of limitation. For example, the electronic device 100 may display only the sender of notification information and may hide the content of the notification information. Alternatively, the electronic device 100 may display only the number of pieces of notification information. Alternatively, the electronic device 100 may not provide notification information while operating in the privacy mode, and may provide the notification information in a batch mode when operating in the normal mode after the privacy mode is released.

Figure 3:
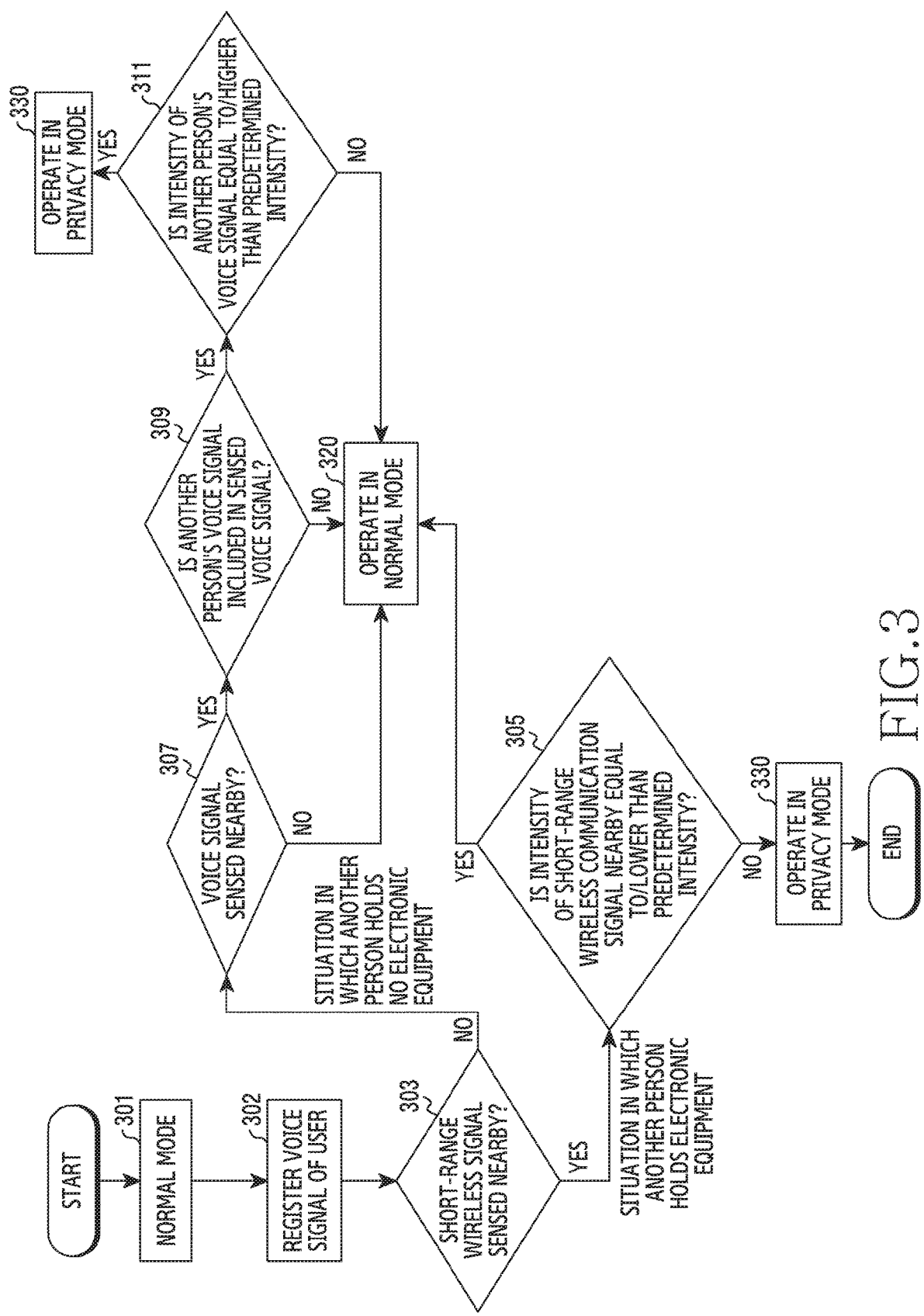
FIG. 3 is a diagram illustrating a process of identifying existence of another person according to an embodiment of the disclosure.

FIG. 3 is a diagram illustrating a process of identifying existence of another person according to an embodiment of the disclosure.

Referring to FIG. 3, at operation 301, the electronic device 100 may be operating in a normal mode. At operation 302, the user may register a voice signal of the user himself/herself via the microphone of the electronic device 100.

At operation 303, the electronic device 100 may confirm whether or not a short-range wireless communication signal (for example, Bluetooth™ low energy (BLE) signal) is sensed near the electronic device 100.

The case in which a short-range wireless communication signal is sensed (Yes at operation 303) may correspond to a situation in which another person holding electronic equipment exists near the electronic device 100. The electronic equipment held by the other person may be provided with a short-range wireless communication module (for example, Bluetooth™, low-power Bluetooth™, Wi-Fi Direct, or IrDA module). Accordingly, the electronic device 100 may sense a short-range wireless communication signal (for example, Bluetooth™ low energy (BLE) radiated from the electronic equipment held by the other person.

In this case, at operation 305, the electronic device 100 may confirm whether or not the intensity of the sensed short-range wireless communication signal is equal to/lower than a predetermined intensity. If the intensity of the sensed short-range wireless communication signal exceeds the predetermined intensity (for example, between 0 and about −30, if the BLE signal intensity (RSSI) is expressed as a value between 0 and −96) (No at operation 305), the electronic device 100 may identify that another person exists near the electronic device 100, and may operate in a privacy mode as at operation 330. On the other hand, if the intensity of the sensed wireless communication signal is equal to/lower than the predetermined intensity (Yes at operation 305), the electronic device 100 may identify that no other person exists near the electronic device 100, and may maintain the existing configuration. For example, as at operation 320, the electronic device 100 may operate in a normal mode in which notification information is provided with no limitation.

Meanwhile, the case in which no short-range wireless communication signal is sensed (No at operation 303) may correspond to a situation in which no other person exists near the electronic device 100, or the other person holds no electronic equipment having a short-range wireless communication module.

In this case, at operation 307, the electronic device 100 may confirm whether or not a voice signal is sensed near the electronic device 100. If no voice signal is sensed near the electronic device 100 (No at operation 307), the electronic device 100 may identify that no other person exists near the electronic device 100, and may operate in the normal mode. On the other hand, if a voice signal is sensed near the electronic device 100 (Yes at operation 307), the electronic device 100 may confirm in operation 309 whether or not the sensed voice signal includes the other person's voice signal. The electronic device 100 may use the user's voice signal preregistered at operation 301 so as to confirm whether or not the other person's voice signal is included in a signal obtained by excluding the user's voice signal from the sensed voice signal.

If the sensed voice signal does not include the other person's voice signal (No at operation 309), the electronic device 100 may identify that there exists no other person nearby, and may operate in the normal mode.

Meanwhile, if the sensed voice signal includes the other person's voice signal (Yes at operation 309), the electronic device 100 may confirm whether or not the intensity of the other person's voice signal is equal to/higher than a predetermined intensity (for example, about 30 decibel or higher). If the intensity of the other person's voice signal is below the predetermined intensity (No at operation 311), the electronic device 100 may identify that no other person exists near the electronic device 100, and may operate in the normal mode as at operation 320. On the other hand, if the intensity of the other person's voice signal is equal to/higher than the predetermined intensity (Yes at operation 311), the electronic device 100 may identify that there exists another person near the electronic device 100, and may operate in the privacy mode as in operation 330.

Meanwhile, if the other person's voice signal is not recognized for a predetermined time as a result of the other person moving away from the electronic device 100, the electronic device 100 may again switch from the privacy mode to the normal mode.

In an embodiment of the disclosure, the electronic device 100 may have the address of a short-range wireless communication module (for example, address of BLE module of another person or address of Wi-Fi module of another person), which has been designated as an exception to application of the privacy mode, preregistered therein. If the electronic device 100 senses a short-range wireless communication signal emitted from the electronic equipment held by the another person, the electronic device 100 may confirm, based on information included in the short-range wireless communication signal, whether or not the short-range wireless communication module that transmitted the short-range wireless communication signal is a short-range wireless communication module preregistered as an exception. If it is confirmed that the short-range wireless communication module has been preregistered as an exception, the electronic device 100 may ignore the short-range wireless communication signal from the electronic equipment provided with the short-range wireless communication module, and may identify whether or not another person exists near the electronic device 100. For example, even if the signal intensity of the short-range wireless communication module preregistered as an exception is equal to/higher than a predetermined intensity, the electronic device 100 may continuously operate in the normal mode, without switching to the privacy mode.

FIG. 4A is a diagram illustrating operations in a privacy mode according to an embodiment of the disclosure, FIG. 4B is a diagram illustrating operations in a privacy mode according to an embodiment of the disclosure, FIG. 4C is a diagram illustrating operations in a privacy mode according to an embodiment of the disclosure, FIG. 4D is a diagram illustrating operations in a privacy mode according to an embodiment of the disclosure, and FIG. 4E is a diagram illustrating operations in a privacy mode according to an embodiment of the disclosure.

At operation 401, the electronic device 100 may be operating in a normal mode. At operation 403, if a user input of selecting a privacy mode is received, the electronic device 100 may operate in the privacy mode, as at operation 405.

Referring to FIG. 4A, the electronic device 100 may display a quick panel 451 at the top of the display 140 in response to a downward touch drag input. The electronic device 100 may operate in the privacy mode in response to a user input of selecting a privacy mode icon 452 included in the quick panel 451. In an embodiment of the disclosure, if another person exists near the electronic device 100, and if a user input of selecting the privacy mode in the quick panel 451 is received, the electronic device 100 may determine that the other person is not a notification information sharer and may operate in the privacy mode. Alternatively, if existence of another person near the electronic device 100 is identified, the electronic device 100 may automatically display a quick panel 451 or a notification icon. In this case, if a user input of setting the privacy mode is received via the quick panel 451 or the notification icon, the electronic device 100 may determine that the identified other person is not a notification information sharer and may operate in the privacy mode.

If it is determined that another person near the electronic device 100 is not a notification information sharer, the result of determination may be stored in the memory 130 of the electronic device 100. Accordingly, if the other person is again identified near the electronic device 100 later, the electronic device 100 may automatically determine that the identified other person is not a notification information sharer and may operate in the privacy mode.

While operating in the privacy mode, the electronic device 100 may receive notification information at operation 407.

At operation 409, the electronic device 100 may display the display type of the notification information provided by the electronic device 100.

If the notification display type of the electronic device 100 is a brief display type displayed on the quick panel or displayed in a locked screen state, the electronic device 100 may confirm the operating state of the electronic device 100 at operation 411.

Referring to FIG. 4B, if it is confirmed that the electronic device 100 is operating in the normal mode, the electronic device 100 may display notification information with no limitation as in FIG. 4B. On the other hand, if it is confirmed that the electronic device 100 is operating in the privacy mode, the electronic device 100 may limit and display notification information as in FIG. 4C. For example, the electronic device 100 may display sender information and may omit the sender's picture and the sent content. Alternatively, a default picture may be provided instead of the sender's picture.

Referring to FIG. 4C, if a user input requesting display of limited notification information is received, the electronic device 100 may display notification information with no limitation as in FIG. 4B. For example, if a user input of selecting the icon 416 is received, or if a voice command requesting display of notification information is received, the electronic device 100 may release the limited notification information and display the notification information. In FIG. 4B, if a user input of selecting the icon 415 is received, or if a user input requesting omission of display of notification information is received, the electronic device 100 may again limit and display notification information as in FIG. 4C.

If it is confirmed by the electronic device 100 at operation 409 that the notification display state is a normal display type in which the same appears as a card at the top of the screen, the electronic device 100 may confirm the operating state of the electronic device 100 at operation 413.

Referring to FIG. 4D, if it is confirmed that the electronic device 100 operates in the normal mode, the electronic device 100 may display notification information with no limitation as in FIG. 4D. On the other hand, if it is confirmed that the electronic device 100 operates in the privacy mode, the electronic device 100 may limit and display notification information as in FIG. 4E. For example, the electronic device 100 may display sender information and may omit the sent content.

Referring to FIG. 4E, if a user input of selecting the icon 418 is received, or if a voice command requesting display of notification information is received, the electronic device 100 may release the limited notification information and display the notification information as in FIG. 4D. In FIG. 4D, if a user input of selecting the icon 417 is received, or if a user input requesting omission of display of notification information is received, the electronic device 100 may again limit and display notification information as in FIG. 4E.

In an embodiment of the disclosure, in FIG. 4A, in response to a user input of selecting the privacy mode ion 452 included in the quick panel 451, the electronic device 100 may change the privacy mode icon 452 to a normal mode icon (not illustrated) and may switch to the privacy mode. In this case, in response to a user input of selecting the normal mode icon (not illustrated) on the quick panel 451, the electronic device 100 may again change the normal mode icon (not illustrated) to the privacy mode ion 452 and may again switch from the privacy mode to the normal mode.

FIG. 5A is a diagram illustrating a privacy-mode operation in a message receiving situation according to an embodiment of the disclosure, FIG. 5B is a diagram illustrating a privacy-mode operation in a message receiving situation according to an embodiment of the disclosure, and FIG. 5C is a diagram illustrating a privacy-mode operation in a message receiving situation according to an embodiment of the disclosure.

Referring to FIG. 5A, the electronic device 100 may be operating in a normal mode. In the normal mode, the electronic device 100 may recognize a person in front of the electronic device 100, based on an image taken by the sensing circuit 110 (for example, camera). In FIG. 5A, if the person in front is recognized as the user, the electronic device 100 may continuously operate in the normal mode. If notification information (for example, text message) is received while operating in the normal mode, the electronic device 100 may display the notification information 501 with no limitation via the display 140.

In this situation, another person 2 may approach the front of the electronic device 100. Based on an image taken by the camera 105, the electronic device 100 may identify that another person exist near the electronic device 100.

If it is identified that another person exists, the electronic device 100 may operate in a privacy mode as in FIG. 5B. In an embodiment of the disclosure, based on an image taken by the camera 105, the electronic device 100 may determine whether or not the other person is an information sharer allowed by the user 1 of the electronic device 100 to share notification information. If it is determined that the other person is not an information sharer, the electronic device 100 may operate in the privacy mode. If notification information is received while operating in the privacy mode, the electronic device 100 may display limited notification information 503, which corresponds to a limited version of the notification information, via the display 140.

Referring to FIG. 5B, if the other person 2 moves away from the front of the electronic device 100, the electronic device 100 may identify that no other person exists near the electronic device 100, based on an image taken by the camera 105.

Referring to FIG. 5C, if it is identified that no other person exists, the electronic device 100 may again operate in the normal mode as in FIG. 5C. The electronic device 100 may then provide at least one piece of notification information 505 acquired while operating in the privacy mode. In this case, together with the at least one piece of notification information, a visual effect indicating that the at least one piece of notification information has been acquired while operating in the privacy mode may be provided. For example, a visual effect may be provided by highlighting the at least one piece of notification information, by varying the brightness or font, or by providing icons 501-1 and 501-2 indicating the privacy mode.

In an embodiment of the disclosure, previous notification information acquired while operating in the privacy mode may include display of the time at which the previous notification information was sent.

Alternatively, previous notification information acquired while operating in the privacy mode may include the time difference between the time at which the previous notification information was sent and the current time. For example, at least one piece of previous notification information may include display of how many hours before the current time the notification information was acquired. For example, with regard to each piece of notification information, the time at which the notification information was sent may be display with reference to the current time, such as 5 minutes ago, 15 minutes ago, or 20 minutes ago. If the area in which the notification time is displayed is limited, the at least one piece of previous notification information may be displayed in a list type and scrolled upwards or downward by a user input.

Alternatively, as the previous notification information acquired while operating in the privacy mode, the number of messages received between the current time and a predetermined time may be displayed. For example, the at least one piece of previous notification information may include information regarding how many messages were received how many hours before the current time, such as "X messages received from XXX 5 minutes ago", or "X messages received before 10-20 minutes ago".

FIG. 6A is a diagram illustrating a privacy-mode operation in a telephone call receiving situation according to an embodiment of the disclosure, FIG. 6B1 is a diagram illustrating a privacy-mode operation in a telephone call receiving situation according to an embodiment of the disclosure, FIG. 6B2 is a diagram illustrating a privacy-mode operation in a telephone call receiving situation according to an embodiment of the disclosure, and FIG. 6C is a diagram illustrating a privacy-mode operation in a telephone call receiving situation according to an embodiment of the disclosure.

Referring to FIG. 6A, the electronic device 100 may be operating in a normal mode. If a telephone call is received as notification information while operating in the normal mode, the electronic device 100 may display a telephone call receiving screen via the display 140 so as to indicate that there is an incoming telephone call.

Referring to FIGS. 6B1 and 6B2, if the electronic device 100 identifies existence of another person near the electronic device 100 in such a situation, the electronic device 100 may operate in a privacy mode. If a telephone call is received while operating in the privacy mode, or if switching to the privacy mode occurs while receiving a telephone call, the electronic device 100 may display a limited telephone call receiving screen as in FIG. 6B1 or FIG. 6B2.

Referring to FIG. 6B1, the electronic device 100 hide the telephone number and the caller information, and may instead display information 601 regarding the call group to which the call belongs and a default image 603, via the display 140. Alternatively, as in FIG. 6B2, the electronic device 100 may hide the telephone number and the caller information, and may instead display mode information 605 indicating operation in the privacy mode and a representative image 607, via the display 140. For example, if there is no caller group to which the caller belongs, the electronic device 100 may display mode information instead of caller group information.

Referring to FIG. 6C, if it is identified that there is no other person near the electronic device 100, the electronic device 100 may again operate in the normal mode in FIG. 6C. In this case, the electronic device 100 may display information 609 regarding unanswered calls received while operating in the privacy mode, via the display 140. The information 609 regarding unanswered calls may include information regarding how many telephone calls were received how many hours before the current time. The unanswered call information may be automatically displayed as the electronic device 100 switches from the privacy mode to the normal mode.

FIG. 7A is a diagram illustrating a privacy-mode operation using a sensing value from a third device according to an embodiment of the disclosure, and FIG. 7B is a diagram illustrating a privacy-mode operation using a sensing value from a third device according to an embodiment of the disclosure.

Referring to FIG. 7A, the electronic device 100 (for example, monitor or computer) may be connected to a third device 700 (for example, smartphone) in a screen sharing mode (for example, DeX mode). In this case, the electronic device 100 may acquire a sensing value sensed by the third device 700 from the third device 700. Based on the acquired sensing value, the electronic device 100 may operate in a privacy mode.

Referring to FIG. 7A, the electronic device 100 may be operating in a normal mode. If notification information is acquired while operating in the normal mode, the electronic device 100 may display unlimited notification information 701 via the display 140. In this case, the third device 700 may acquire a sensing value sensed by the sensing circuit of the third device 700. The sensing value may be, for example, a taken image of another person, a voice signal of another person, or a short-range wireless communication signal produced from the electronic device held by another person. For example, if the third device 700 is a smartphone, the sensing value may be an image taken by a low-power face recognition camera positioned on the front surface of the smartphone. The third device 700 may transmit the acquired sensing value to the electronic device 100. The electronic device 100 may identify existence of another person near the electronic device 100, based on the acquired sensing value. Alternatively, the third device 700 may identify existence of another person, based on the acquired sensing value. In this case, the third device 700 may transmit the result of identifying another person to the electronic device 100. The process of the electronic device 100 or the third device 700 identifying whether or not another person exists has already been described in connection with other embodiments of the disclosure, including FIG. 3, and repeated description thereof will be omitted herein.

If it is identified that another person exists, the electronic device 100 may determine whether or not the other person 2 is an information sharer allowed by the user 1 of the electronic device 100 to share notification information. In another embodiment of the disclosure, the third device 700 may identify existence of another person and may determine whether or not the other person 2 is an information sharer allowed by the user 1 to share notification information. The third device 700 may determine the association between recognition information related to the other person 2 and information sharer information. The information sharer information may be registered by the user via the third device 700 or acquired from the electronic device 100.

If the other person 2 is determined to be an information sharer, the electronic device 100 may continuously operate in the normal mode as in FIG. 7A. If the other person 2 is not determined to be an information sharer, the electronic device 100 may operate in the privacy mode as in FIG. 7B.

Referring to FIG. 7B, if notification information is acquired while the electronic device 100 operates in the privacy mode as in FIG. 7B, the electronic device 100 may display limited notification information 703 via the display 140. Thereafter, if it is identified that no other person exists, or if it is determined that the other person is an information sharer, the electronic device 100 may again switch to and operate in the normal mode, as in FIG. 7A.

FIG. 8A is a diagram illustrating a privacy-mode operation in a transportation device according to an embodiment of the disclosure, and FIG. 8B is a diagram illustrating a privacy-mode operation in a transportation device according to an embodiment of the disclosure.

Referring to FIGS. 8A and 8B, the electronic device 100 may be a transportation device. The transportation device may be any of various transportation means, such as a four-wheeled vehicle, a two-wheeled vehicle, a self-driving vehicle robot, an aerial vehicle, or a ship, but is not limited thereto. Alternatively, the transportation device may include at least one of at least a part of an infotainment system (in-vehicle infotainment (IVI)) for a transportation device (for example, for vehicle), a global navigation satellite system (GNSS)), an event data recorder (EDR), a flight data recorder (FDR), ship electronic equipment (for example, ship navigation device or gyro compass), an avionics, or a vehicular head unit. Alternatively, the electronic device 100 may be at least a part of an advanced driver assistance system (ADAS). Alternatively, the electronic device 100 may be at least a part of a control device, such as an electronic control unit (ECU) that electronically controls various functions related to travel of the transportation device. In addition, if the electronic device 100 is an external device mounted on a transportation device, the electronic device 100 may be at least a part of a driving assist device, such as on-board diagnostics (OBD) connected to a connector (for example, OBD terminal or ODB connector) for a transportation device (for example, for vehicle), for example.

In FIG. 8A, the transportation device 100 may be operating in a normal mode. If notification information is acquired while operating in the normal mode, the transportation device 100 may display at least one pieces of notification information 801 and 803 with no limitation via a head-up display 140a or a dashboard display 140b. In the normal mode, the transportation device 100 may identify whether or not there is another occupant in the electronic device 100 besides the driver, based on an image taken by the sensing circuit (for example, camera). Alternatively, the transportation device 100 may identify whether or not there is another occupant in the electronic device 100 besides the driver, based on the pressure applied to seats of the transportation device 100, or based on sensing the opening/closing of doors corresponding to seats other than the driver seat.

If it is identified that another person exists, the transportation device 100 may operate in a privacy mode in as in FIG. 8B. Alternatively, if it is determined that the other person is not an information sharer allowed by the user 1 to share notification information, the electronic device 100 may operate in the privacy mode. If notification information is acquired while operating in the privacy mode, the transportation device 100 may limit and display notification information. The transportation device 100 may determine whether or not to limit notification information according to the display position.

For example, the head-up display 140a is included in the range of the field of view of the user, but is positioned such that it is hardly noticeable in other occupant's field of view, and it may thus be unnecessary to display limited notification information. Therefore, as in FIG. 8B, the transportation device 100 may display limitless notification information 805 via the head-up display 140a, and may display limited notification information 807 via the dashboard display 140, which may be seen by the other occupant.

Thereafter, if it is identified that there is no other occupant, or if it is determined that the other occupant is an information sharer, the transportation device 100 may again operate in the normal mode in which notification information is displayed with no limitation via the head-up display 140a and the dashboard display 140b, as in FIG. 8B.

FIG. 9A1 is a diagram illustrating a privacy-mode operation in a transportation device according to an embodiment of the disclosure, FIG. 9A2 is a diagram illustrating a privacy-mode operation in a transportation device according to an embodiment of the disclosure, FIG. 9B1 is a diagram illustrating a privacy-mode operation in a transportation device according to an embodiment of the disclosure, and FIG. 9B2 is a diagram illustrating a privacy-mode operation in a transportation device according to an embodiment of the disclosure.

Referring to FIGS. 9A1 to 9B2, the transportation device 100 may display notification information via a dashboard display 140b. In this case, the dashboard display 140b is visible not only to the driver, but also to other occupants, and there is accordingly a need to limit display of notification information in the privacy mode.

FIG. 9A1 and FIG. 9A2 illustrate a situation in which the transportation device 100 displays notification information, and FIG. 9B1 and FIG. 9B2 illustrate a situation in which the transportation device 100 displays a telephone call receiving screen.

In an embodiment of the disclosure, if notification information is acquired while the transportation device 100 operates in the normal mode, the transportation device 100 may display limitless notification information 901 via the dashboard display 140b as in FIG. 9A1. On the other hand, if notification information is acquired while the transportation device 100 operates in the privacy mode, the transportation device 100 may display limited notification information 903 via the dashboard display 140b as in FIG. 9A2. For example, the transportation device 100 may display the number of pieces of notification information as the notification information.

In another embodiment of the disclosure, if a telephone call is received while the transportation device 100 operates in the normal mode, the transportation device 100 may display telephone caller information and the telephone caller's number via the dashboard display 140b with no limitation as in FIG. 9B1. On the other hand, if a telephone call is received while the transportation device 100 operates in the privacy mode, the transportation device 100 may display a telephone call receiving screen with limited notification information via the dashboard display 140b as in FIG. 9B2. For example, the transportation device (e.g., electronic device 100) may display notification information while hiding the telephone caller's number.

In another embodiment of the disclosure, the transportation device 100 may not display notification information via the display 140b while the transportation device 100 operates in the privacy mode. Alternatively, the transportation device 100 may block incoming telephone calls while the transportation device 100 operates in the privacy mode.

In another embodiment of the disclosure, if notification information or a telephone call is received while operating in the normal mode, the transportation device 100 may output the notification information as a voice while interworking with a sound mode, or may switch the telephone call to a speaker mode such that the counterpart's voice is output. On the other hand, if notification information or a telephone call is received while operating in the privacy mode, the transportation device 100 may display notification information or a telephone call screen via the head-up display.

Figure 10A:
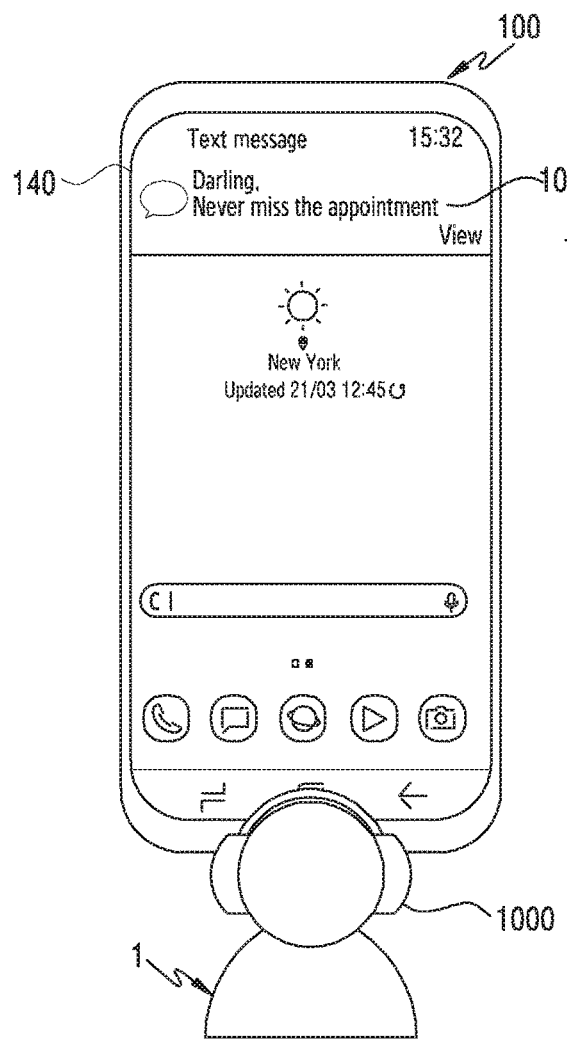
FIG. 10A is a diagram illustrating a privacy-mode operation when a wearable output device is worn according to an embodiment of the disclosure.
Figure 10B:
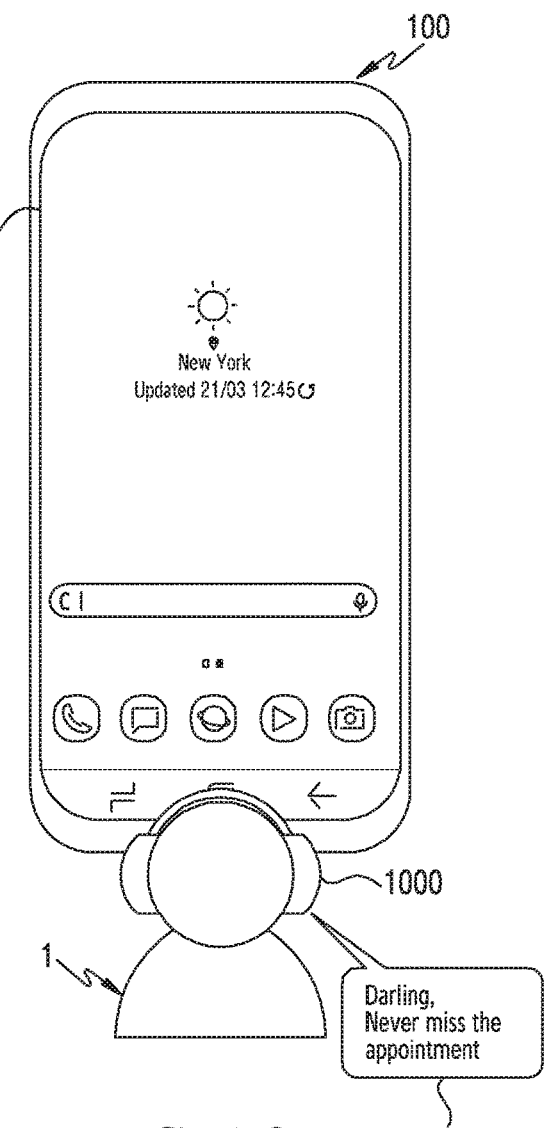
FIG. 10B is a diagram illustrating a privacy-mode operation when a wearable output device is worn according to an embodiment of the disclosure.

FIG. 10A is a diagram illustrating a privacy-mode operation when a wearable output device is worn according to an embodiment of the disclosure, and FIG. 10B is a diagram illustrating a privacy-mode operation when a wearable output device is worn according to an embodiment of the disclosure.

Referring to FIGS. 10A and 10B, the wearable output device 1000 may be, for example, an earphone, a headphone, or a VR headset.

In this case, if notification information is acquired while the electronic device 100 operates in the normal mode, the electronic device 100 may display limitless notification information 1001 via the display 140 as in FIG. 10A.

On the other hand, if notification information is acquired while the electronic device 100 operates in the privacy mode, the electronic device 100 may confirm whether or not the electronic device 100 is being connected to a wearable output device 1000. If it is confirmed that the electronic device 100 is being connected to a wearable output device 1000, the electronic device 100 may convert the acquired notification information into a voice and may output the same as voice information 1003 to the user via the wearable output device 1000, as in FIG. 10B. This makes it possible to provide the acquired notification information only to the user (not to any other person).

Figure 11:
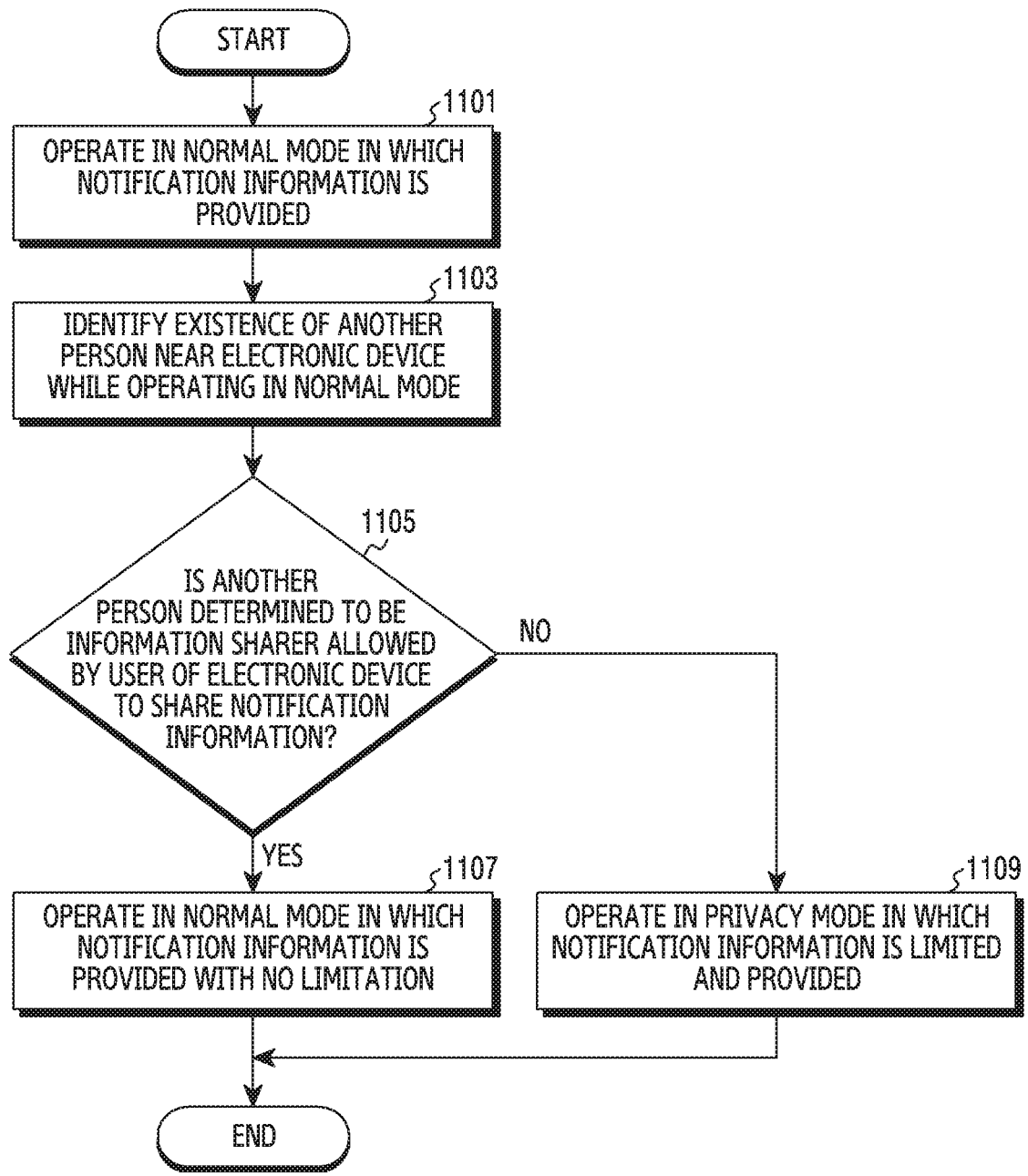
FIG. 11 is a flowchart of an electronic device according to an embodiment of the disclosure.

FIG. 11 is a flowchart of an electronic device according to an embodiment of the disclosure.

Referring to FIG. 11, at operation 1101, the electronic device 100 may operate in a normal mode in which notification information is provided.

At operation 1103, the electronic device 100 may identify existence of another person near the electronic device 100 while operating in the normal mode. For example, the electronic device 100 may sense a short-range wireless communication signal near the electronic device 100 and may identify existence of another person near the electronic device 100 based on the intensity of the sensed short-range wireless communication signal. As another example, the electronic device 100 may sense a voice signal near the electronic device 100 and may identify existence of another person near the electronic device 100 based on the intensity of a voice signal obtained by excluding the user's voice signal from the sensed voice signal. As another example, the electronic device 100 may acquire a sensing value sensed by a third device positioned outside the electronic device 100 and may identify existence of another person near the electronic device 100 based on the sensing value acquired from the third device.

At operation 1105, the electronic device 100 may determine whether or not the other person is an information sharer allowed by the user of the electronic device 100 to share notification information. For example, the electronic device 100 may determine that the other person is not an information sharer, in response to selection of the privacy mode via the quick panel of the electronic device 100. As another example, the electronic device 100 may display image information related to the identified other person and may determine that the identified other person is an information sharer in response to selection of the image information. As another example, the electronic device 100 may determine whether or not the identified other person is an information sharer, based on the association between recognition information recognized in connection with the other person and preregistered information sharer information.

If it is determined that the other person is an information sharer (Yes at operation 1105), the electronic device 100 may operate in a normal mode in which notification information is provided with no limitation at operation 1107.

On the other hand, if it is determined that the other person is not an information sharer (No at operation 1105), the electronic device 100 may operate in a privacy mode in which notification information is limited and provided, at operation 1109. In this case, the electronic device 100 may operate in a privacy mode in which notification information is limited according to the level of limitation of notification information and then provided. If notification information is acquired while operating in the privacy mode, the electronic device 100 may provide limited notification information produced by processing at least a part of the notification information, substituting different information therefor, or omitting at least a part of the notification information.

Figure 12:
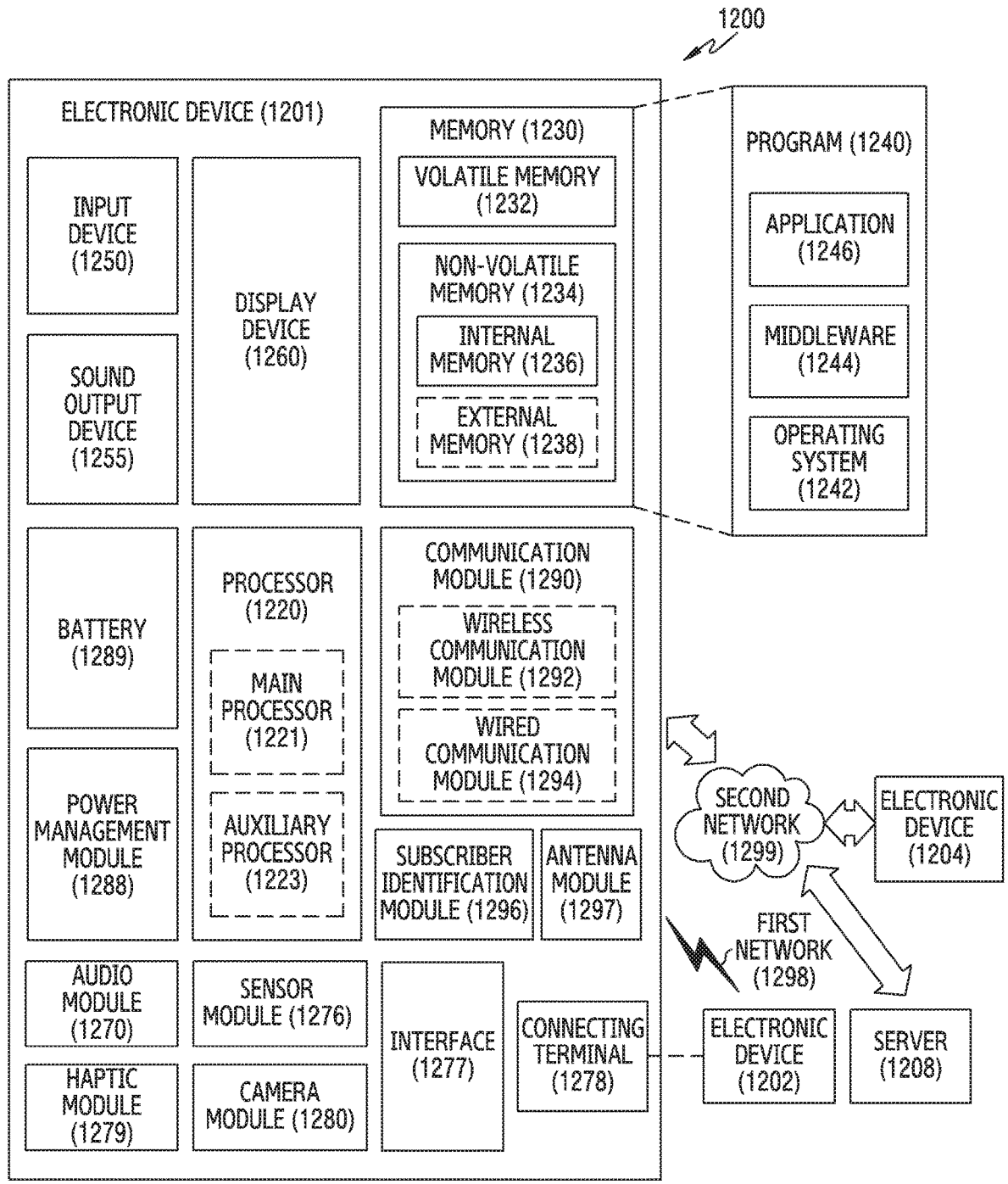
FIG. 12 is a block diagram of an electronic device inside a network environment according to an embodiment of the disclosure.

FIG. 12 is a block diagram illustrating an electronic device in a network environment according to an embodiment of the disclosure.

Referring to FIG. 12, an electronic device 1201 in a network environment 1200 may communicate with an electronic device 1202 via a first network 1298 (e.g., a short-range wireless communication network), or an electronic device 1204 or a server 1208 via a second network 1299 (e.g., a long-range wireless communication network). According to an embodiment of the disclosure, the electronic device 1201 may communicate with the electronic device 1204 via the server 1208. According to an embodiment of the disclosure, the electronic device 1201 may include a processor 1220, memory 1230, an input device 1250, a sound output device 1255, a display device 1260, an audio module 1270, a sensor module 1276, an interface 1277, a haptic module 1279, a camera module 1280, a power management module 1288, a battery 1289, a communication module 1290, a subscriber identification module (SIM) 1296, or an antenna module 1297. In some embodiments of the disclosure, at least one (e.g., the display device 1260 or the camera module 1280) of the components may be omitted from the electronic device 1201, or one or more other components may be added in the electronic device 1201. In some embodiments of the disclosure, some of the components may be implemented as single integrated circuitry. For example, the sensor module 1276 (e.g., a fingerprint sensor, an iris sensor, or an illuminance sensor) may be implemented as embedded in the display device 1260 (e.g., a display).

The processor 1220 may execute, for example, software (e.g., a program 1240) to control at least one other component (e.g., a hardware or software component) of the electronic device 1201 coupled with the processor 1220, and may perform various data processing or computation. According to one embodiment of the disclosure, as at least part of the data processing or computation, the processor 1220 may load a command or data received from another component (e.g., the sensor module 1276 or the communication module 1290) in volatile memory 1232, process the command or the data stored in the volatile memory 1232, and store resulting data in non-volatile memory 1234. According to an embodiment of the disclosure, the processor 1220 may include a main processor 1221 (e.g., a central processing unit (CPU) or an application processor (AP)), and an auxiliary processor 1223 (e.g., a graphics processing unit (GPU), an image signal processor (ISP), a sensor hub processor, or a communication processor (CP)) that is operable independently from, or in conjunction with, the main processor 1221. Additionally or alternatively, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display device 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment of the disclosure, the auxiliary processor 1223 (e.g., an image signal processor or a communication processor) may be implemented as part of another component (e.g., the camera module 1280 or the communication module 1290) functionally related to the auxiliary processor 1223.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input device 1250 may receive a command or data to be used by other component (e.g., the processor 1220) of the electronic device 1201, from the outside (e.g., a user) of the electronic device 1201. The input device 1250 may include, for example, a microphone, a mouse, a keyboard, or a digital pen (e.g., a stylus pen).

The sound output device 1255 may output sound signals to the outside of the electronic device 1201. The sound output device 1255 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 1260 may visually provide information to the outside (e.g., a user) of the electronic device 1201. The display device 1260 may include, for example, a display, a hologram device, or a projector and control circuitry to control a corresponding one of the display, hologram device, and projector. According to an embodiment of the disclosure, the display device 1260 may include touch circuitry adapted to detect a touch, or sensor circuitry (e.g., a pressure sensor) adapted to measure the intensity of force incurred by the touch.

The audio module 1270 may convert a sound into an electrical signal and vice versa. According to an embodiment of the disclosure, the audio module 1270 may obtain the sound via the input device 1250, or output the sound via the sound output device 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment of the disclosure, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment of the disclosure, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment of the disclosure, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 1279 may include, for example, a motor, a piezoelectric element, or an electric stimulator.

The camera module 1280 may capture an image or moving images. According to an embodiment of the disclosure, the camera module 1280 may include one or more lenses, image sensors, image signal processors, or flashes.

The power management module 1288 may manage power supplied to the electronic device 1201. According to one embodiment of the disclosure, the power management module 1288 may be implemented as at least part of, for example, a power management integrated circuit (PMIC).

The battery 1289 may supply power to at least one component of the electronic device 1201. According to an embodiment of the disclosure, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment of the disclosure, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The antenna module 1297 may transmit or receive a signal or power to or from the outside (e.g., the external electronic device) of the electronic device 1201. According to an embodiment of the disclosure, the antenna module 1297 may include an antenna including a radiating element composed of a conductive material or a conductive pattern formed in or on a substrate (e.g., PCB). According to an embodiment of the disclosure, the antenna module 1297 may include a plurality of antennas. In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment of the disclosure, another component (e.g., a radio frequency integrated circuit (RFIC)) other than the radiating element may be additionally formed as part of the antenna module 1297.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 1201 and the external electronic device 1204 via the server 1208 coupled with the second network 1299. Each of the electronic devices 1202 and 1204 may be a device of a same type as, or a different type, from the electronic device 1201. According to an embodiment of the disclosure, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for providing notification information by an electronic device, the method comprising:
   operating in a normal mode in which notification information is provided;
   identifying existence of a different person near the electronic device while operating in the normal mode;
   determining whether the different person is an information sharer allowed by a user of the electronic device to share notification information;
   operating in the normal mode in which notification information is provided without being limited, in response to determining that the different person is an information sharer; and
   operating in a privacy mode in which notification information is limited and provided, in response to determining that the different person is not an information sharer,
   wherein the privacy mode is performed without locking a display of the electronic device and without obscuring a display of the electronic device, an indication of a received notification being displayed in the display while operating in privacy mode, and
   wherein the indication of the received notification includes limited information including at least one of the number of pieces of the notification information or an identifier of a sender corresponding to the notification information.

2. The method of claim 1, wherein the identifying of the existence of the different person near the electronic device comprises:
   sensing a short-range wireless communication signal near the electronic device; and
   identifying existence of the difference person near the electronic device, based on intensity of the sensed short-range wireless communication signal.

3. The method of claim 1, wherein the identifying of the existence of the different person near the electronic device comprises:
   sensing a voice signal near the electronic device; and
   identifying existence of the different person near the electronic device, based on intensity of a voice signal obtained by excluding a voice signal of the user from the sensed voice signal.

4. The method of claim 1, wherein the identifying of the existence of the different person near the electronic device comprises:
   acquiring a sensing value acquired by a third device positioned outside the electronic device; and
   identifying existence of the different person near the electronic device, based on the sensing value acquired from the third device.

5. The method of claim 1, wherein the determining of whether the different person is an information sharer comprises:
   determining that the different person is not an information sharer, in response to selection of the privacy mode via a panel of the electronic device.

6. The method of claim 1, wherein the determining of whether the different person is an information sharer comprises:
   displaying image information related to the identified different person; and
   determining that the identified different person is an information sharer, in response to selection of the image information.

7. The method of claim 1, wherein the determining of whether the different person is an information sharer comprises:
   determining whether the identified different person is an information sharer, based on association between recognition information recognized in connection with the different person and preregistered information sharer information.

8. The method of claim 1, further comprising:
   determining a limitation level of notification information provided in the privacy mode,
   wherein the operating in a privacy mode comprises operating in a privacy mode in which notification information is limited according to the limitation level and provided.

9. The method of claim 1, further comprising:
   operating in the normal mode again from the privacy mode; and
   providing previous notification information acquired while operating in the privacy mode, in response to operating in the normal mode.

10. The method of claim 1, further comprising:
    acquiring notification information while operating in the privacy mode; and
    providing limited notification information produced by processing at least a part of the notification information, substituting different information therefor, or omitting at least a part of the notification information.

11. An electronic device comprising:
    a sensing circuit;
    a memory configured to store at least one instruction; and
    a processor operably connected to the sensing circuit and the memory,
    wherein the memory is configured to store at least one instruction configured to cause the processor, when executed, to:
       identify existence of a different person near the electronic device, based on a sensing value sensed via the sensing circuit while operating in a normal mode in which notification information is provided,
       determine whether the different person is an information sharer allowed by a user of the electronic device to share notification information,
       operate the electronic device in the normal mode in which notification information is provided without being limited, in response to determining that the different person is an information sharer, and
       operate the electronic device in a privacy mode in which notification information is limited and provided, in response to determining that the different person is not an information sharer,
    wherein the privacy mode is performed without locking a display of the electronic device and without obscuring a portion of the display of the electronic device, an indication of a received notification being displayed in the display while operating in privacy mode, and
    wherein the indication of the received notification includes limited information including at least one of the number of pieces of the notification information or an identifier of a sender corresponding to the notification information.

12. The electronic device of claim 11, wherein the memory is further configured to store at least one instruction configured to cause the processor, when executed, to:
identify existence of the different person near the electronic device, based on predetermined intensity of a short-range wireless communication signal near the electronic device, sensed via the sensing circuit.

13. The electronic device of claim 11, wherein the memory is further configured to store at least one instruction configured to cause the processor, when executed, to:
identify existence of the different person near the electronic device, based on intensity of a voice signal obtained by excluding a voice signal of the user from a voice signal sensed near the electronic device via the sensing circuit.

14. The electronic device of claim 11, wherein the memory is further configured to store at least one instruction configured to cause the processor, when executed, to:
identify existence of the different person near the electronic device, based on a sensing value sensed by a third device positioned outside the electronic device.

15. The electronic device of claim 11, wherein the memory is further configured to store at least one instruction configured to cause the processor, when executed, to:
determine that the different person is not an information sharer, in response to selection of the privacy mode via a panel of the electronic device, when existence of the difference person is identified near the electronic device.

16. The electronic device of claim 11, further comprising:
a display,
wherein the memory is further configured to store at least one instruction configured to cause the processor, when executed, to:
control the display so as to display image information related to the different person, and
determine that the identified different person is an information sharer, in response to selection of the image information.

17. The electronic device of claim 11, wherein the memory is further configured to store at least one instruction configured to cause the processor, when executed, to:
determine whether the identified different person is an information sharer, based on association between recognition information recognized in connection with the different person and preregistered information sharer information.

18. The electronic device of claim 11, wherein the memory is further configured to store at least one instruction configured to cause the processor, when executed, to:
determine a limitation level of notification information provided in the privacy mode, and
operate the electronic device in a privacy mode in which notification information is limited according to the limitation level and provided.

19. The electronic device of claim 11,
wherein the memory is further configured to store at least one instruction configured to cause the processor, when executed, to:
operate the electronic device in the normal mode again from the privacy mode, and
provide previous notification information acquired while the electronic device operates in the privacy mode, in response to operation of the electronic device in the normal mode.

20. The electronic device of claim 11, the memory is further configured to store at least one instruction configured to cause the processor, when executed, to:
acquire notification information while the electronic device operates in the privacy mode, and
provide limited notification information produced by processing at least a part of the notification information, substituting different information therefor, or omitting at least a part of the notification information.

* * * * *